United States Patent Office 2,848,480
Patented Aug. 19, 1958

2,848,480

PRODUCTION OF KETO ESTERS

Walton J. Smith, Garden City, N. Y., assignor to Smith-New York Co., Inc., Freeport, N. Y., a corporation of New York No Drawing. Application February 19, 1953
Serial No. 337,880

9 Claims. (Cl. 260—483)

This application is a continuation-in-part of application Serial No. 161,727, filed May 12, 1950, now abandoned.

The present invention relates to the production of keto esters, and it has for its object the provision of a new and improved process for this purpose.

Another object of the present invention is to provide a simple and economical process for producing acetone dicarboxylic acid esters from citric acid esters. Various other objects and advantages will be apparent as the nature of the invention is more fully disclosed.

Esters of acetone dicarboxylic acid have previously been prepared by the esterification of acetone dicarboxylic acid. Acetone dicarboxylic acid is in turn produced by the reaction between citric acid and oleum at low temperatures, under which conditions formic acid is split out, forming the enol of acetone dicarboxylic acid, which undergoes tautomeric rearrangement into the keto form as follows:

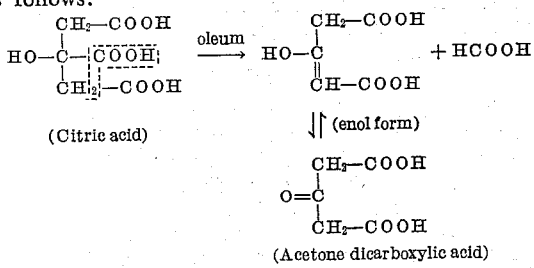

The formic acid which is split off is not stable in the presence of oleum, and decomposes to form carbon monoxide and water. The process of formation of acetone dicarboxylic acid by the oleum method offers the very considerable disadvantages that on a commercial scale, it is difficult and costly to operate at the required subfreezing temperatures in acid-resisting plant equipment, and the formation of carbon monoxide is obviously less advantageous than the formation of carbon dioxide, which is produced by the process of the present invention.

Additionally, the esterification of acetone dicarboxylic acid is not a satisfactory process for the production of acetone dicarboxylic acid esters. The acid is unstable, even at room temperature. Esterification of acetone dicarboxylic acid is preferably conducted at elevated temperatures at which the decomposition rate of the acid is very great. Resort to lower esterification temperatures greatly increases the time required to complete the esterification reaction, and considerable losses of acetone dicarboxylic acid due to decomposition are not avoided.

As a result of the facts stated above, neither acetone dicarboxylic acid nor its esters is available in commercial quantities, although some of these compounds have been known for decades.

The present invention is based upon my discovery that citric acid esters may be oxidized by means of agents such as chromic acid to produce acetone dicarboxylic acid esters. A highly important advantage of my process is that it is commercially feasible. The esters produced thereby are useful in the production of pharmaceuticals, drugs, alkaloids, dyes and other organic chemicals. Thus, where the esters are the preferred form of acetone dicarboxylic acid, the ester is, in accordance with the present invention, produced by oxidizing the ester form of citric acid.

It should be noted that the utilization of the conventional techniques known to the art for the transformation of citric acid into acetone dicarboxylic acid are not operative for the transformation of the ester of citric acid into the ester of acetone dicarboxylic acid. Specifically, the treatment of esters of citric acid with oleum or highly concentrated sulfuric acid does not result in the production of substantial amounts of acetone dicarboxylic acid esters. On the contrary, the oleum merely acts to decompose or hydrolyze the ester group.

It is, moreover, of interest to note that the oxidation of citric acid esters to the corresponding esters of acetone dicarboxylic acid proceeds in accordance with an entirely different mechanism than does the reaction between oleum and citric acid. As previously mentioned, the reaction between oleum and citric acid produces formic acid, which decomposes into carbon monoxide and water. It is a reaction which takes place under dehydrating conditions. Any water which is formed by the reaction combines with the $SO_3$ of the oleum to form sulfuric acid. When the $SO_3$ has been used in this way or diminished, the reaction rate drops. On the other hand, oxidation of the ester of citric acid results in the formation of carbon dioxide, rather than the monoxide, and the reaction is performed under aqueous conditions at relatively low temperatures. These conditions are not those familiarly known as conditions under which any kind of splitting out of either water or formic acid could take place, and the production of carbon dioxide shows that it does not in fact take place. Consequently, it should be clear that the reaction does not involve the splitting off of formic acid from the citric acid molecule, which is the mechanism attending the reaction between citric acid and oleum.

The successful oxidation of citric acid esters to the corresponding esters of acetone dicarboxylic acid is quite surprising, in view of the teachings of Kuyper in the Journal of the American Chemical Society, volume 55, of April 1933, to the effect that attempts to oxidize citric acid by means of a sulfuric acid solution of permanganate at room temperature result in the production of only formaldehyde, formic acid and carbon dioxide. Kuyper states that the formation of less highly oxidized products is improbable, neither acetone nor any other partial oxidation products being detectable.

The process of the present invention may employ many different esters of citric acid. Among the liquid esters which I have oxidized to the corresponding acetone dicarboxylic acid esters are: mono- and diethyl, mono- and dibutyl, and mono- and dipropyl, although the process is by no means limited to the use of these esters. In fact, the above were oxidized and studied as examples only of various types of mono- and di-citric acid esters which could be treated by this process to form the corresponding acetone dicarboxylic acid esters.

It is also a purpose of the present invention to provide a useful method of purification of citric acid esters. It has been found that citric acid esters which are esterified with respect to the carboxylic acid group bonded to the beta carbon atom are more resistant to oxidation than are citric acid esters in which the carboxylic acid group attached to the beta carbon atom has not been esterified. Consequently, a mixture of citric acid esters may be oxidized under controlled conditions so that the more stable forms thereof are not attacked. The esters which undergo oxidation have one less carboxyl group, and the alcohol group has been oxidized to the ketone. Consequently, the oxidation products have decidedly different properties from the properties of the starting materials, and may be easily separated from the oxidation-resistant citric acid esters which have not been attacked. It should, therefore, be evident that oxidation of a mixture of citric acid esters will result in an ester of acetone dicarboxylic acid considerably purer than the mixture of citric acid esters from which they have been derived, because they contain a much smaller amount of esters in which the carboxyl group attached to the beta carbon atom is esterified. At the same time, the unreacted mixture of citric acid esters will be considerably purified by virtue of the removal from the mixture of a large proportion of those esters in which the carboxyl group attached to the beta carbon atom was not esterified.

Although chromic acid is preferred as an oxidizing agent, it is by no means the only oxidizing agent which can be used for the purposes of my invention. Other agents which have been used to prepare acetone dicarboxylic acid esters according to the invention are potassium permanganate and potassium dichromate (with sulfuric acid). The invention is not limited to the use of these agents, but may employ any agent capable of oxidizing the alcohol group on the central carbon atom in citric acid or its esters. In the case of each of the above mentioned oxidizing agents, successful oxidation of citric acid ester to a corresponding acetone dicarboxylic acid has been observed, although not necessarily with equal efficacy. Thus, preliminary oxidations in acetic acid using chromic acid dissolved in acetic acid resulted in low yields of the desired product, and the resulting product was difficult to purify. The elimination of acetic acid in the reaction (either due to the influence of impurities in the acetic acid itself or the absence of water), and the substitution of water gave a very smooth reaction, and gave a good yield of the desired keto ester. It is similarly possible that oxidations of citric acid esters may be made equally well with potassium permanganate, although at the present time this agent is considered to be inferior. The oxidizing agent of choice will depend on the other conditions of the oxidation, such as pH, solvent and temperature.

Although the oxidation in Example I below is made in water, other solvents and solvent aids may be present. Thus, successful oxidations have been made in glacial acetic acid, and other solvents such as methyl ethyl ketone, benzene and ethyl acetate may be present to reduce the further oxidation of the desired acetone dicarboxylic acid ester.

While the oxidation may advantageously be made with a technical grade diester or monoester, this is by no means required for the operation of the process. Thus, pure symmetrical dicyclohexyl citrate has been oxidized to the corresponding acetone dicarboxylic acid diester. The oxidation of a technical grade material has an advantage in that it offers a means of production of a purer grade asymmetrical citric acid ester, and the acetone dicarboxylic acid ester can be regarded as the by-product of the reaction, or vice versa, depending upon the commercial outlook. The use of a pure starting material offers an advantage in certain cases for the simplification of the oxidation process, a pure product, etc.

Although the oxidation in Example I which follows is made at temperatures above room temperature, this is not considered to be a limiting factor, and under certain circumstances a milder temperature might be favored, and even cooling might be advisable in some cases.

Furthermore, where the oxidation example is described as being made at a pH resulting from sulfuric acid excess, this does not necessarily represent the ideal condition for this type of oxidation. Other oxidations have been made using acidification media such as acetic acid as an example of organic acids.

The following examples employ laboratory procedures, and it will be evident that certain modifications may be made without limiting the scope of the invention.

EXAMPLES

*Example I*

100 grams of technical grade dipropyl citrate (containing a mixture of asymmetrical and symmetrical dipropyl esters) is mixed with 100 grams of water and 41 grams of 50% sulfuric acid were added. Seven grams of chromic acid dissolved in about 15 cc. of water are added to the mixture with stirring in a 600 cc. breaker without external cooling. After about fifteen minutes' stirring, the temperature rises to 40°–50° C. As the reaction appears nearly complete, as evidenced by a slight drop in temperature, an additional 7 grams of chromic acid are added and the stirring is continued for another fifteen minutes. The solution is green and has evolved considerable carbon dioxide, showing that the reaction has gone to completion. The mixture is cooled and extracted with benzene. The benzene layer is washed with water, then with sodium sesquicarbonate solution, and eventually dried with anhydrous sodium sulfate. The benzene is distilled off and the residue distilled under high vacuum (approximately 1 mm. pressure), at which pressure the main fraction distills at 100°–120° C., and is dipropyl acetone dicarboxylate. It gives a red color with ferric chloride solution in alcohol, and it has a refractive index of 1.44 (25° C.). An analysis of the main fraction was as follows:

Calculated: C, 57.36; H, 7.88. Found: C, 57.50; H, 8.02.

The above reaction illustrates the method of separation of citric esters with an ester group on the central carbon atom, from a mixture of esters. The sodium carbonate (sesquicarbonate) extract is acidified with dilute sulfuric acid and an oil separates out which is asymmetrical dipropyl citrate.

*Example II*

This is an example of an oxidation in the presence of an inert solvent to reduce the solubility of the acetone dicarboxylate, once formed, in the aqueous layer.

100 grams of technical grade dipropyl citrate is mixed with 100 grams of water, 50 grams of benzene, and 41 grams of 50% sulfuric acid then are added. Seven grams of chromic acid dissolved in about 15 cc. of water are added and the reaction allowed to proceed as in the previous example; and at the point when the temperature is dropping, an additional 7 grams of chromic acid is added and the stirring continued for an added time. The mixture is cooled and additional benzene added, the lower layer drawn off in a separatory funnel, and the benzene layer washed with water, then sesquicarbonate, and eventually water, and dried with anhydrous sodium sulfate. The benzene was distilled off under vacuum, and the residue distilled in high vacuum. The product exhibited similar properties as described in the previous example.

*Example III*

100 grams of technical grade diethyl citrate ester to which had been added 100 cc. of water and extracted with benzene to remove triester, were oxidized with 18 grams of potassium permanganate added in solid form in portions to the stirred solution with external cooling, to which solution also had been added 36 grams of 50% sulfuric acid. The temperature rose and considerable carbon dioxide gas was evolved, and the solution eventually appeared to react only slowly with additional permanganate, and was nearly colorless. The mixture was filtered from excess permanganate. Two layers were apparent, and they were separated in a separatory funnel. The nonaqueous layer consisted of monoethyl acetone dicarboxylate, diethyl acetone dicarboxylate and a further substance which has not yet been identified. The yield of diethyl acetone dicarboxylate in this particular example was not as great as that achieved with chromic acid oxidation. The above is an example of the production of a monoester of acetone dicarboxylate together with the diester.

*Example IV*

Oxidation of diethyl citrate (technical) with chromic acid as in Example I yielded a cleaner product, and a greater yield of the diethyl acetone dicarboxylate was produced than in Example III.

*Example V*

Fifty grams of crystalline, symmetrical dicyclohexyl citrate were dissolved in 220 cc. of acetic acid and 4.5 grams of chromic acid (dissolved in a minimum of water and diluted with a few cc. of acetic acid) were added with stirring. The reaction occured slowly and was allowed to stand overnight, during which time carbon dioxide was evolved slowly. The reaction mixture was diluted with water and washed with some dilute sulfuric acid. The product was thick. It was washed with water and ammonium hydroxide added to the stirred mixture until neutral to remove unoxidized starting material. The resulting washed oil was distilled under high vacuum, yielding a small amount of an oil having the properties of a beta ketone, namely, giving a strong test with ferric chloride. The yield of this product was not high.

*Example VI*

1400 grams of crystalline dimethyl citrate were stirred with four liters of hot water, and 410 cc. of concentrated sulfuric acid and four liters of toluene were added. The mixture was held at 65° C. during the addition of 500 grams of chromic acid dissolved in 1250 cc. of water by means of gradual addition with constant agitation. At the end of the addition of the chromic acid, the reaction mixture was cooled and separated. The toluene was distilled off, yielding 385 grams of crude residue. One distillation of this residue yielded a product having all the qualities of purified dimethyl acetone dicarboxylate.

*Example VII*

100 grams of technical grade dibutyl citrate, freed of tributyl citrate, were dissolved in 50 cc. of glacial acetic acid and the theoretical amount of chromic acid (dissolved in a minimum of water and diluted with a few ccs. of acetic acid) to oxidize the complete mixture to a ketone were added along with some 50% sulfuric acid to keep the mixture strongly acidic. The mixture reacted vigorously and the temperature rose to 60° C. Stirring with external cooling was continued a few minutes, the mixture cooled and diluted with water, yielding an oil. The oil was mixed with water and neutralized with ammonium hydroxide. The remaining neutral oil was distilled under high vacuum, and then redistilled, collecting five fractions. The first three fractions gave strong ferric chloride tests for a beta keto ester.

It should be pointed out that the above examples show the oxidation of symmetrical diesters and asymmetrical monoesters to form corresponding esters of acetone dicarboxylic acid. The asymmetrical diesters and symmetrical monoesters are not readily reactive with chromic acid under the conditions employed.

I claim:

1. A process wherein a citric acid ester, selected from the group consisting of asymmetrical lower alkyl and cycloalkyl monoesters of citric acid and symmetrical lower alkyl and cycloalkyl diesters of citric acid, is oxidized to an ester of acetone dicarboxylic acid, which comprises subjecting said citric acid ester to the action of a chemical oxidation agent selected from the group consisting of chromic acid, potassium permanganate, and potassium dichromate at temperatures up to about 65° C. in a solvent selected from the group consisting of aqueous acid and water in admixture with an organic solvent for said ester of acetone dicarboxylic acid and isolating said ester of acetone dicarboxylic acid from the reaction mixture.

2. A process as recited in claim 1 in which said citric acid ester employed is said symmetrical diester.

3. A process as recited in claim 1 in which said citric acid ester employed is said asymmetrical monoester.

4. The process of claim 1 wherein said citric acid ester is present in a mixture containing an ester of citric acid, selected from the group consisting of lower alkyl and cycloalkyl esters, wherein the carboxylic acid group attached to the beta-carbon atom is esterified.

5. A process for producing esters of acetone dicarboxylic acid by oxidation of an acid ester selected from the group consisting of asymmetrical lower alkyl and cycloalkyl monoesters of citric acid and symmetrical lower alkyl and cycloalkyl diesters of citric acid, which comprises oxidizing said citric acid ester in an aqueous medium acidified with a mineral acid and containing chromic acid, said oxidation being carried out at temperatures up to about 65° C. and isolating said acetone dicarboxylic acid from the reaction mixture.

6. A process of producing an acetone dicarboxylic acid ester which comprises oxidizing at temperatures up to about 65° C. a citric acid ester selected from the group consisting of asymmetrical lower alkyl and cycloalkyl monoesters of citric acid and symmetrical lower alkyl and cycloalkyl diesters of citric acid, with a chemical oxidation agent selected from the group consisting of chromic acid, potassium permanganate, and potassium dichromate, said oxidation being conducted in intimate contact with water and an organic solvent, said organic solvent being a solvent for said acetone dicarboxylic acid ester and forming a separate phase in said reaction medium whereby said acetone dicarboxylic acid ester is extracted from the aqueous phase of the reaction mixture as it is produced by said oxidation.

7. A process of producing a mixture of acetone dicarboxylic acid esters by oxidizing a mixture of citric acid esters selected from the group consisting of mono- and diesters of citric acid of the formula:

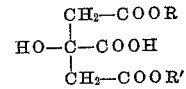

wherein R is selected from the group consisting of hydrogen, lower alkyl and cycloalkyl and R' is selected from the group consisting of lower alkyl and cycloalkyl, said oxidation resulting from the action of a chemical oxidizing agent selected from the group consisting of chromic acid, potassium permanganate, and potassium dichromate in the presence of water and a mineral acid at temperatures up to about 65° C. and isolating said mixture of acetone dicarboxylic acid esters.

8. A process of producing diesters of acetone dicarboxylic acid and simultaneously purifying a mixture of citric acid esters, wherein said mixture contains esters of citric acid having the carboxylic acid group attached to the beta-carbon atom esterified with an alcohol selected from the group consisting of lower alkanols and cycloalkanols which comprises oxidizing symmetrical lower alkyl and cycloalkyl citric acid diesters to said diesters of acetone dicarboxylic acid by the action of a chemical oxidation agent selected from the group consisting of chromic acid, potassium permanganate, and potassium dichromate, said oxidation being conducted in an aqueous medium at temperatures up to about 65° C. and separating said diesters of acetone dicarboxylic acid from said citric acid esters wherein the carboxylic acid group attached to the beta-carbon atom is esterified.

9. A process as recited in claim 8 in which said acetone dicarboxylic acid esters and said citric acid esters are separated from the reaction mixture by extraction with a solvent selected from the group consisting of benzene and methyl ethyl ketone and said citric acid esters are removed from the solvent by extraction with sodium sesquicarbonate.

References Cited in the file of this patent

Kuyper: Jour. Am. Chem. Soc. 55, 1722–27 (1933).
Winther: Chem. Abst. 30, col. 385 (1936).
Milbanes: Chem. Abst. 32, col. 3244 (1938).
Peltz: Chem. Abst. 32, col. 9042 (1938).
Adams: Organic Syntheses, Collective Vol. I, 2nd ed., pp. 10–12 (1941).
Courtois: Ann. Pharm. Franc. 7 (February 1949), pp. 77–89.